US011774835B2

(12) United States Patent
Sluka

(10) Patent No.: US 11,774,835 B2
(45) Date of Patent: Oct. 3, 2023

(54) LIGHT-FIELD VIRTUAL AND MIXED REALITY SYSTEM HAVING FOVEATED PROJECTION

(71) Applicant: CREAL SA, Ecublens VD (CH)

(72) Inventor: Tomas Sluka, Lausanne (CH)

(73) Assignee: CREAL SA

( * ) Notice: Subject to any disclaimer, the term of this patent is extended or adjusted under 35 U.S.C. 154(b) by 0 days.

(21) Appl. No.: 17/771,776

(22) PCT Filed: Oct. 26, 2020

(86) PCT No.: PCT/IB2020/060019
§ 371 (c)(1),
(2) Date: Apr. 25, 2022

(87) PCT Pub. No.: WO2021/090107
PCT Pub. Date: May 14, 2021

(65) Prior Publication Data
US 2022/0404689 A1    Dec. 22, 2022

(30) Foreign Application Priority Data

Nov. 6, 2019    (EP) .................................... 19207397

(51) Int. Cl.
G03B 21/14    (2006.01)
G03B 21/20    (2006.01)
(52) U.S. Cl.
CPC ....... G03B 21/142 (2013.01); G03B 21/2013 (2013.01)
(58) Field of Classification Search
CPC .......................... G03B 21/142; G03B 21/2013

USPC .......................................................... 353/81
See application file for complete search history.

(56) References Cited

U.S. PATENT DOCUMENTS

2004/0227063 A1    11/2004  Viinikanoja
2010/0289970 A1    11/2010  Watanabe
2019/0324272 A1    10/2019  Seo et al.

FOREIGN PATENT DOCUMENTS

EP    3321746 A1    5/2018

OTHER PUBLICATIONS

International Search Report and Written Opinion for PCT/IB2020/060019 dated Jan. 25, 2021, 14 pages.

*Primary Examiner* — Jerry L Brooks

(57) ABSTRACT

The present disclosure concerns a light-field projection system, comprising a pin-light array generating an incident light-field illuminating an optical light modulator for modulating the incident light-field and projecting a plurality of modulated light-field components along a projection axis; a first optical element configured for forming first pin-light images in a first pin-light plane and modulator images in a modulator image plane; and a second optical element defining an eye-box region and for forming second pin-light images in a second pin-light plane within the eye-box; the first and second pin-light planes and the modulator image plane being substantially perpendicular to the projection axis; the system further comprising at least one optical device at the first pin-light plane and being configured for interacting with at least one of the modulated light-field components, spatially shifting the modulated light-field components in the modulator image plane. The light-field projection allows for foveated projection.

16 Claims, 14 Drawing Sheets

(a)

(b)                    (c)

(a)

(b)

(c)

(a)

(b) (c)

(a)

(b)                          (c)

(a)

(b)

(c)

LIGHT-FIELD VIRTUAL AND MIXED REALITY SYSTEM HAVING FOVEATED PROJECTION

RELATED APPLICATIONS

This application is a national phase of PCT/IB2020/060019, filed on Oct. 26, 2020, which claims the benefit of European Patent Application No. EP19207397.1, filed on Nov. 6, 2019. The entire contents of these applications are hereby incorporated by reference.

FIELD

The present disclosure relates to a near-eye light-field virtual and mixed reality system and in particular to a near-eye light-field virtual and mixed reality system having foveated projection.

DESCRIPTION OF RELATED ART

Human eye has a very wide field of view (FOV). Individually, human eye eyes have a horizontal FOV of about 135° and a vertical FOV of just over 180°. FOV allows for coverage of an area rather than a single focused point. In virtual reality (VR) and/or mixed reality device, a large FOV is essential to getting an immersive, life-like experience. Wider FOV also provides better sensor coverage or accessibility for many other optical devices.

Virtual or mixed reality device would have to provide some 400 000 000 pixel to cover this FOV with regularly distributed pixels to satisfy the highest resolution of the eye.

However, the resolution of an eye is not evenly distributed. It has high resolution only in some 20° FOV around its fovea. A full HD display (1920×1080) covering 20° FOV already reaches retinal resolution at fovea. The eye resolution gradually drops farther from fovea. Whole FOV (outside fovea) can be covered with about the same amount of information as inside the fovea putting the total number of pixels needed to some 4 000 000.

So called foveated rendering and projection is being introduced to virtual and mixed reality headsets to exploit exactly this feature of human vision. But this is still performed with flat images. Light-field devices do not have any solution yet for foveated projection.

Document US20190324272 discloses a three-dimensional (3D) image display apparatus. The apparatus includes a plurality of light sources; a spatial light modulator configured to modulate light from the plurality of light sources according to 3D image information; and a focusing optical system configured to focus an image formed by the spatial light modulator onto a focal plane. The plurality of light sources may be arranged such that multiple focal points, respectively corresponding to the plurality of light sources, are formed on the focal plane near a pupil of a user.

SUMMARY

The present disclosure concerns a light-field projection system, comprising: a pin-light array comprising a plurality of point-lights and generating an incident light-field illuminating an optical light modulator configured for modulating the incident light-field and projecting a plurality of modulated light-field components along a projection axis; a first optical element configured for forming first pin-light images in a first pin-light plane and modulator images in a modulator image plane; and a second optical element defining an eye-box region and configured for forming second pin-light images in a second pin-light plane within the eye-box; wherein the first and second pin-light planes and modulator image plane are substantially perpendicular to the projection axis and wherein the modulator image plane is between the first optical element and second optical element; and wherein the system further comprising at least one optical device at the first pin-light plane and being configured to deflect at least one of the modulated light-field components, such as to s spatially shift the modulator image in the modulator image plane.

The light-field projection system is able to provide virtual and mixed reality experience to the eyes of any human, animal or a camera. A user of the light-field projection system can experience realistic mixing of real and virtual 3D scenes. The light-field projection system is suitable for delivering 3D virtual and augmented reality information with the comfort of the correct eye accommodation.

The light-field projection system can comprise an eye-tracking and steering device. The eye-tracking and steering device may be used to determine where a viewer is looking to thereby determine where the foveal region is in relation to the projected image.

The light-field projection system allows for foveated projection. In particular, the light-field projection system can create light-field which provides higher angular resolution image in a narrow field of view (FOV) and low angular resolution image for wide FOV. The light-field projection system reduces the rendering workload by greatly reducing the image quality in the peripheral vision (outside of the zone gazed by the fovea).

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS

Figure 1:
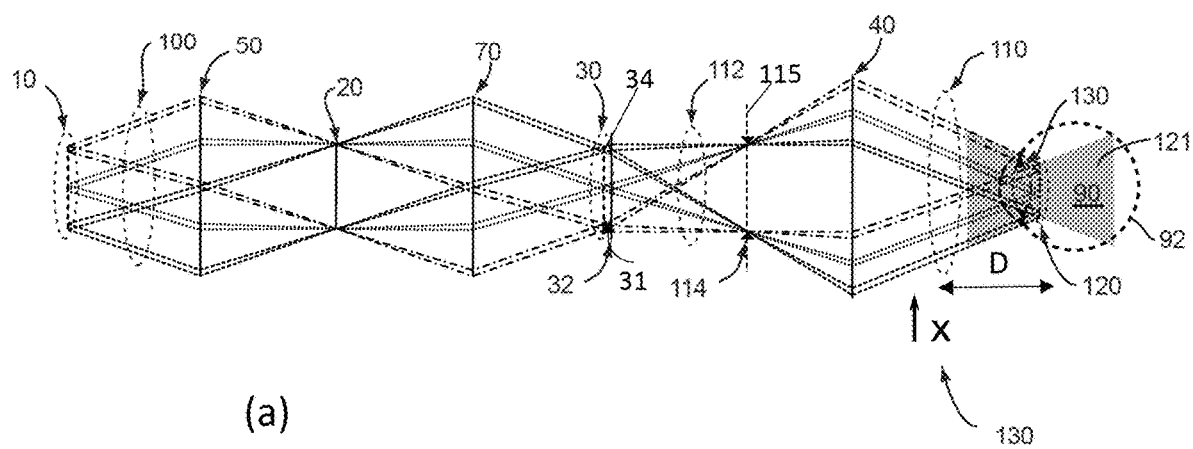
FIG. 1a illustrates a light-field projection system comprising an optical light modulator projecting modulated light-field components.
FIGS. 1b and 1c show projected images of the optical light modulator as seen by a viewer when a viewer's eye focuses at infinity (FIG. 1b) and closer than at infinity (FIG. 1c)
Figure 1:
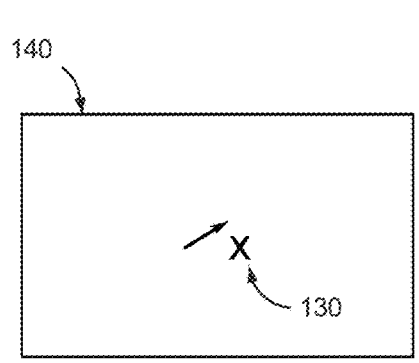
Figure 1:
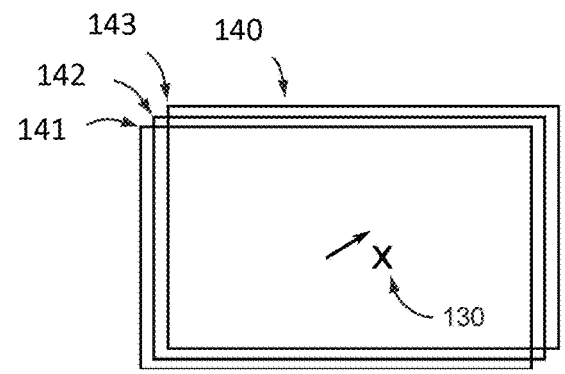
Figure 2:
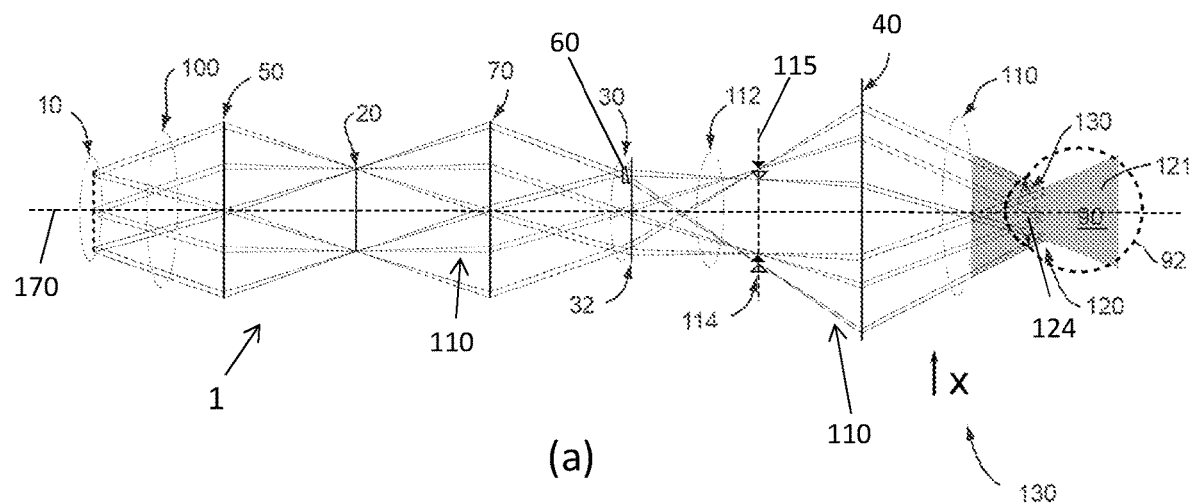
FIG. 2a shows the light-field projection system comprising an a deflecting prism interacting with at least one of the modulated light-field components, according to an embodiment.
FIGS. 2b and 2c show projected images of the optical light modulator of the system of FIG. 2a, when a viewer's eye focuses at infinity (FIG. 2b) and closer than at infinity (FIG. 2c)
FIG. 2d shows a layout of a modulated light-field component passing through the deflecting prism.
Figure 2:
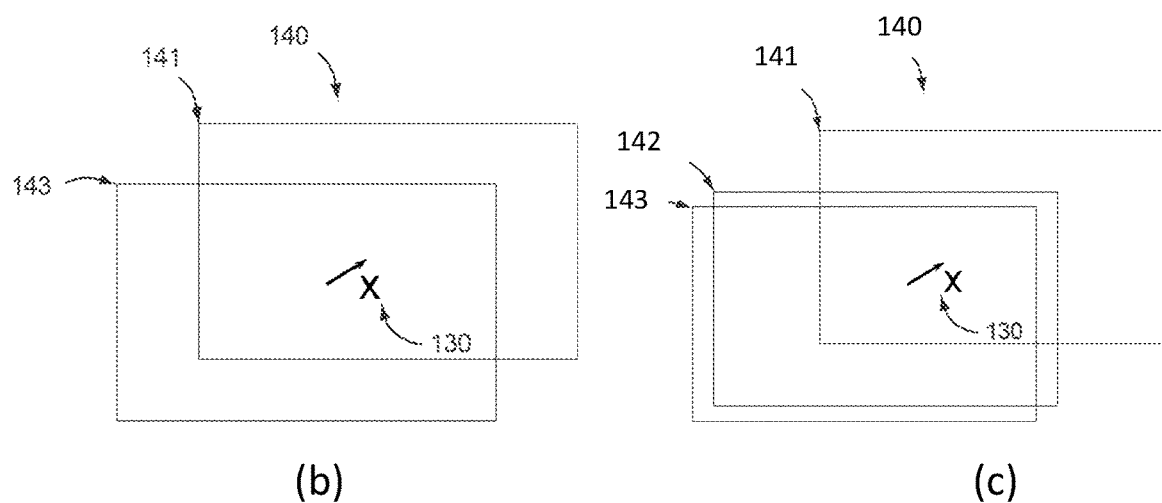

FIG. 1a illustrates a light-field projection system 1 comprising a pin-light array 10 generating an incident light-field 100 illuminating an optical light modulator 20 configured for modulating the incident light-field 100 and projecting a plurality of modulated light-field components 110 along a projection axis 170. The system 1 further comprises a first pin-light optical element 70 configured for forming first pin-light images 31 in a first pin-light plane 30 substantially perpendicular to the projection axis 170. The first pin-light optical element 70 can comprise an imaging lens. The system 1 further comprises a second optical element 40 defining an eye-box region 121 and configured for forming second pin-light images 120 in a second pin-light plane 124 within the eye-box 121. The second pin-light plane 124 is substantially perpendicular to the projection axis 170. The second pin-light plane 124 can correspond to a virtual image aperture, or an exit pupil, within the eye box 121, the exit pupil 124 comprising the plurality of second pin-light images 120 (three second pin-light images 120 are represented in FIG. 2a).

Optionally, the light-field projection system 1 can comprise a modulator optical element 32 configured for forming modulator images 114 of the optical light modulator 20 in a modulator image plane 115, also substantially perpendicular to the projection axis 170. The modulator image plane 115 is projected by the second optical element 40 at a distance D from the eye-box region 121. The distance D can be infinity or any distance along the projection axis 170, at either side of the eye-box region 121. The distance D at infinity or any distance along the projection axis 170 is typically outside the accommodation range of a viewer.

Alternatively, the modulator image plane 115 can be created by the first pin-light optical element 70 with corresponding optical power or by placing the first pin-light optical element 70 at a different distance along the projection axis 170.

The second optical element 40 can comprise an eye piece. The eye-piece 40 can comprise optical elements, such as a convex lens, mirror, curved mirror, semi-transparent mirror or set of lenses, mirrors or semi-transparent mirrors can be configured to place the modulator images 115 at an image distance D from the eye-box region 121. The distance D can be set to infinity or any distance along the projection axis 170, at either side of the eye-box region 121.

The light-field projection system 1 can comprise a Fourier filter 34 located at the first pin light plane 30. We note that the Fourier filter 34 is not necessarily placed exactly in the Fourier plane of the optical light modulator 20. For each viewpoint, the Fourier filter 34 can be configured to remove all but one diffraction component from the modulated light-field components 110, that are reflected and diffracted on the optical light modulator 20. Here, the term "viewpoint" corresponds to one modulated light-field component 110.

The Fourier filter 34 can comprise at least one imaging lens which creates image plane of the modulated light-field component 110. The Fourier filter 34 can comprise a pinhole array, for example made of an optically non-transparent and non-translucent plate or other filtering pattern. The Fourier filter 34 can be alternatively arranged in a reflection mode, where the pinholes or other filtering pattern are substituted with micromirrors. The Fourier filter 34 generates a modulated and filtered virtual light-field 112. Here, the viewpoint corresponds to one light-field component 110 passing through one pinhole.

The light-field projection system 1 is destined to be worn by a viewer for virtual and mixed reality applications. The light-field projection system can be configured such that, when it is worn by the viewer the eye-box 121, and the exit pupil 124, is within the viewer's eye 90. The second optical element 40 transmits the modulated light-field components 110 towards the pupil 130 of the viewer's eye 90, such that the modulated light-field components 110 are projected on the retina 92.

The double lines from each represented modulated light-field component 110 are used to describe the limitation of real system which need to be taken into account. Neither the pin-light array 10 nor the Fourier filter 34 have zero aperture. The image of the optical light modulator 20 must be treated in such a way that the light from each pixel is projected towards the eye-box 121 (and thus towards the viewer's eye 90) in more or less collimated narrow beam (the best is if it is slightly converging to a point far behind the eye-box 121 so that viewer's eye 90 cannot focus on it and therefore all images in accommodation range of the viewer appear similar).

FIG. 1b shows projected images 140 of the optical light modulator 20, for the three second pin-light images 120 when a viewer wear the light-field projection system 1, when the viewer's eye 90 focuses at infinity.

FIG. 1c shows the projected images 140 when the viewer's eye 90 focuses closer than at infinity. Here, the viewer sees three projected images 141, 142, 143 for each of the three second pin-light images 120, where the three projected images 141, 142, 143 are slightly shifted one with respect to the other.

FIG. 2a shows the light-field projection system 1, according to an embodiment. The light-field projection system 1 further comprises at least one optical device 60 at the first pin-light plane 30. The optical device 60 is configured for interacting with at least one of the modulated light-field components 110. More particularly, the optical device comprises a deflecting prism 60 configured to deflect one of the modulated light-field components 110 such that the modulator image 114 is spatially shifted in its modulator image plane 115. The spatial shift of the modulator image 114 in the modulator image plane 115 is indicated by the white triangles. The non-shifted modulator images 114 are indicated by the black triangles. The deflecting prism 60 does not change the location of the modulator image 114 along the projection axis 170, relative to the modulator image plane 115 without use of the prism 60. The rest of the optics (first and second optical elements 70, 40 and modulator optical element 32) does also not change the position of the modulator image 114 of the modulated light-field component 110 that is deflected by the deflecting prism 60.

Figure 2D:
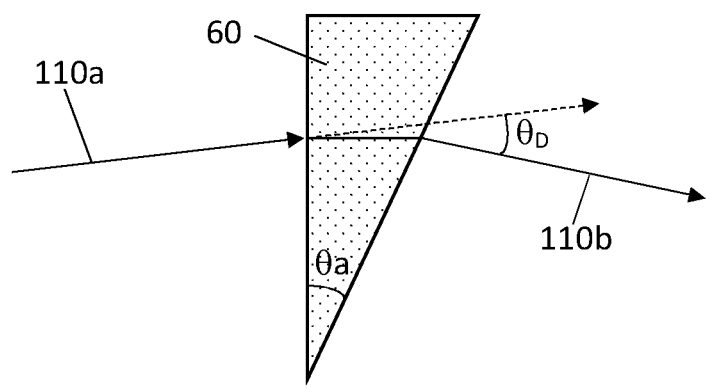

A layout of a modulated light-field component 110 passing through the deflecting prism 60 is shown in FIG. 2d. The deflection angle $\theta_D$ can be defined as the angle from the incident modulated light-field component 110a to the exit modulated light-field component 110b of the exit of the deflection prism 60. The deflection angle $\theta_D$ depends on the difference in orientation between the incident face 611 and the exit face of the deflecting prism 60, or the apex angle $\theta_a$ in FIG. 2d. Other configurations of the deflection prism 60 can be considered. For example, the deflection prism 60 shape can includes uniform triangular prism having equal base angles or can be substituted by a diffraction grating.

FIG. 2b shows projected images of the optical light modulator 20, i.e., the second pin-light images 120 when a viewer wear the light-field projection system 1, when the viewer's eye 90 focuses at infinity. If one calls "viewpoints" the second pin-light images 120 (and the first pin-light images 31 in the first pin-light plane 30), then from the viewpoints, the viewer sees a patchwork of projected images 140 corresponding to the FOV of the viewer (in a plane). More particularly, the viewer sees a non-shifted projected image 141 corresponding to one of the non-deflected modulated light-field components 110, and a shifted projected image 143 corresponding to the modulator images 114 spatially shifted in the modulator image plane 115 by the deflecting prism 60 and projected by the eye-piece 40 to a distance D from the exit pupil 124.

FIG. 2c shows the projected images 140 when the viewer's eye 90 focuses closer than at infinity. The shifted projected image 143, corresponding to the modulator images 114 spatially shifted in the modulator image plane 115 by the deflecting prism 60, has larger shift relative to the projected images 141, 142 corresponding to the modulator images 114 of the non-deflected modulated light-field components 110.

In FIG. 3a, the light-field projection system 1 is represented comprising two deflecting prisms 60, wherein each deflecting prism 60 is configured to deflect one of the modulated light-field components 110 by a predetermined angle. FIGS. 3b and 3c compare the non-shifted projected image 142 with the shifted projected images 141, 143 seen by the viewer focusing at infinity (FIG. 3b) and seen by the viewer focusing at a distance closer than infinity (FIG. 3c).

The spatial shift of the two deflected modulated light-field components 110 is shown by the white triangles while the position in the modulator image plane 115 of the non-deflected modulated light-field components 110 is indicated by the black triangles.

The light-field projection system 1 can comprise more than two deflecting prisms 60 in order to deflect a plurality of modulated light-field components 110.

Figure 4:
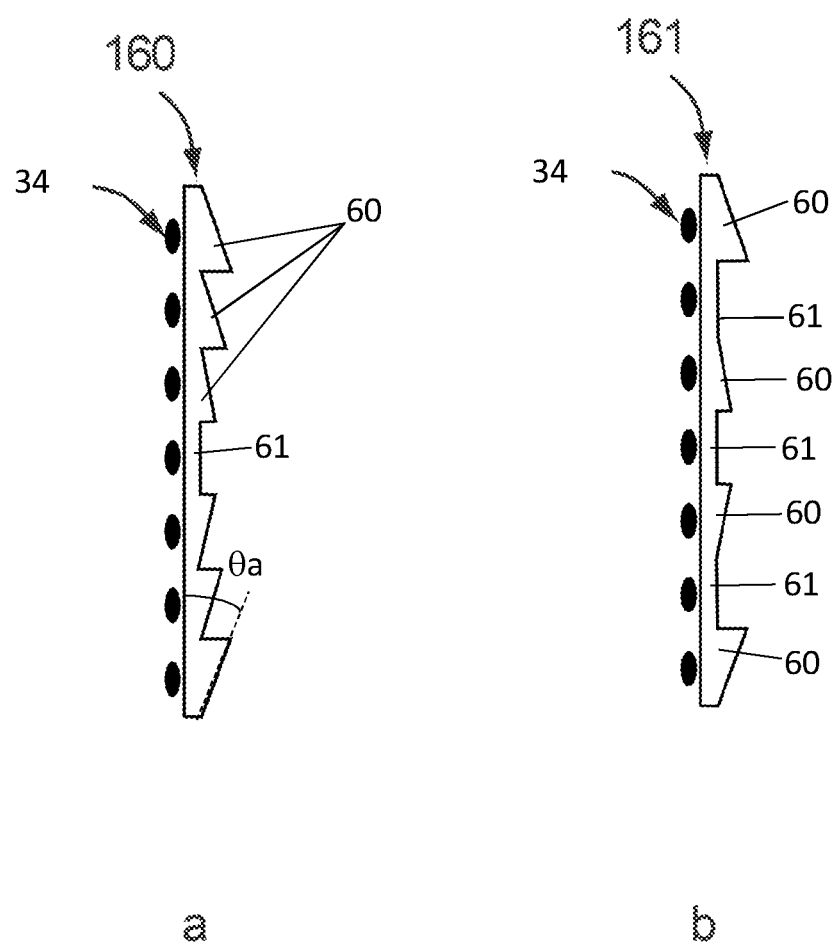
FIGS. 4a and 4b show the optical device comprising an array of a plurality of deflecting prisms (FIG. 4a) and a plurality of deflecting prisms and neutral optical elements (FIG. 4b), according to an embodiment.

FIGS. 4a and 4b show a cross-section view of the optical device comprising an array 160 including a plurality of deflecting prisms 60. For example, the array 160 can be an array of microprisms.

The array 160 can be configured such that each deflecting prisms 60 interacts with one modulated light-field component 110. The array 160 can further be configured such that each deflecting prisms 60 interacts with more than one modulated light-field component 110, or such that multiple prisms 60 perform identical optical transformation on multiple light-field components 110.

In one aspect, the array 160 is configured such that different deflecting prisms 60 of the array 160 may have different apex angle $\theta_a$. In the example of FIGS. 4a and 4b, the apex angle $\theta_a$ increases from the center of the array 160 to the periphery, such that the modulated light-field components 110 are deflected with increasing deflection angle $\theta_D$ from the center toward the periphery of the array 160. Other configurations of the deflecting prisms 60 in the array 160 is possible. For example, the apex angle $\theta_a$ of the deflecting prisms 60 can decrease from the center of the array 160 to the periphery or can be substantially the same for all deflecting prisms 60 in the array 160.

In one aspect, the array 160 comprises at least one neutral optical element 61. The modulated light-field component 110 interacting with such neutral optical element 61 is not spatially shift the modulator image plane 115. The modulator image 114 of the modulated light-field component 110 interacting with such neutral optical element 61 is also not shifted along the projection axis 170, relative to the modulator image plane 115.

The neutral optical element 61 can comprise a flat lens. In FIG. 4a, the array 160 comprises a neutral optical element 61 in the center of the array 160. In the example of FIG. 4b, the array 160 comprises deflecting prims 60 and neutral optical elements 61 in alternance, from the center to the periphery of the array 160. The center of the array is made of a neutral optical elements 61. The Fourier filter 34 is also represented in FIGS. 4a and 4b.

Figure 3:
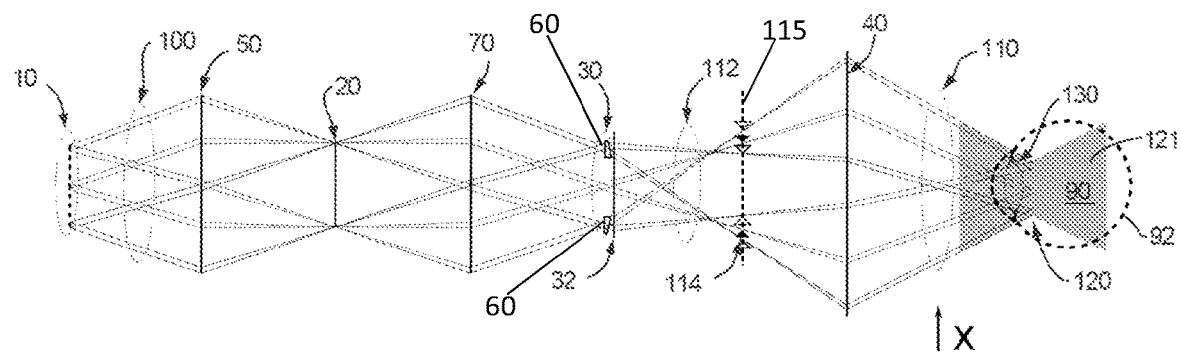
FIG. 3a shows the light-field projection system comprising a plurality of deflecting prisms, according to an embodiment.
FIGS. 3b and 3c show projected images of the optical light modulator of the system of FIG. 3a, when a viewer's eye focuses at infinity (FIG. 3b) and closer than at infinity (FIG. 3c)
Figure 3:
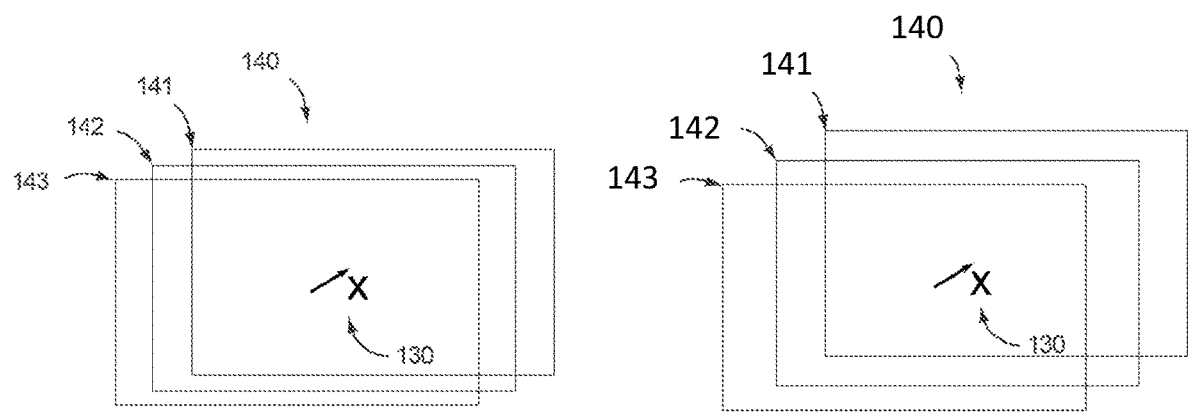
Figure 5:
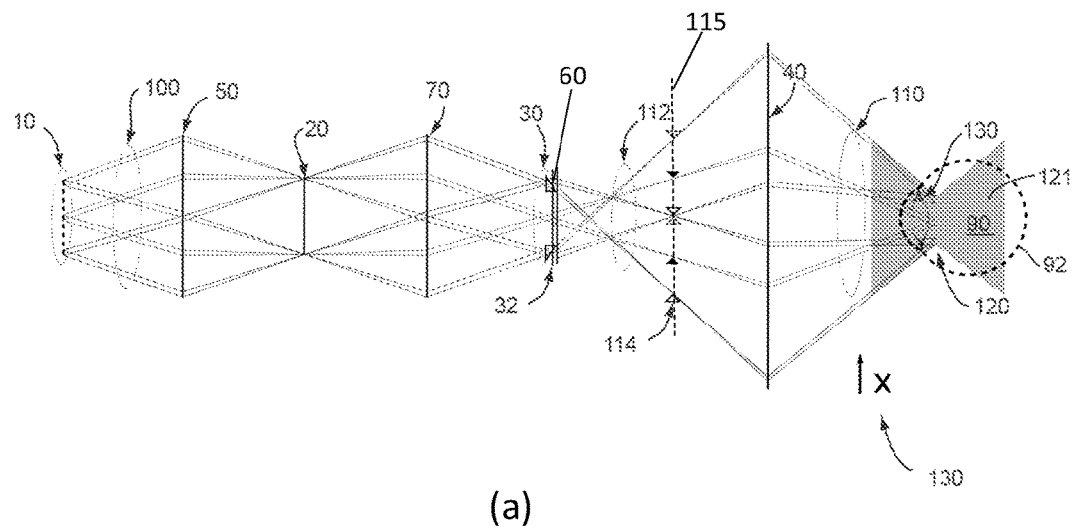
FIGS. 5a-c show a specific configuration of light-field projection system of FIG. 3a (FIG. 5a) creating a patchwork of spatially separated images seen by the viewer focusing at infinity (FIG. 5b) and closer than at infinity (FIG. 5c), according to an embodiment.
Figure 5:
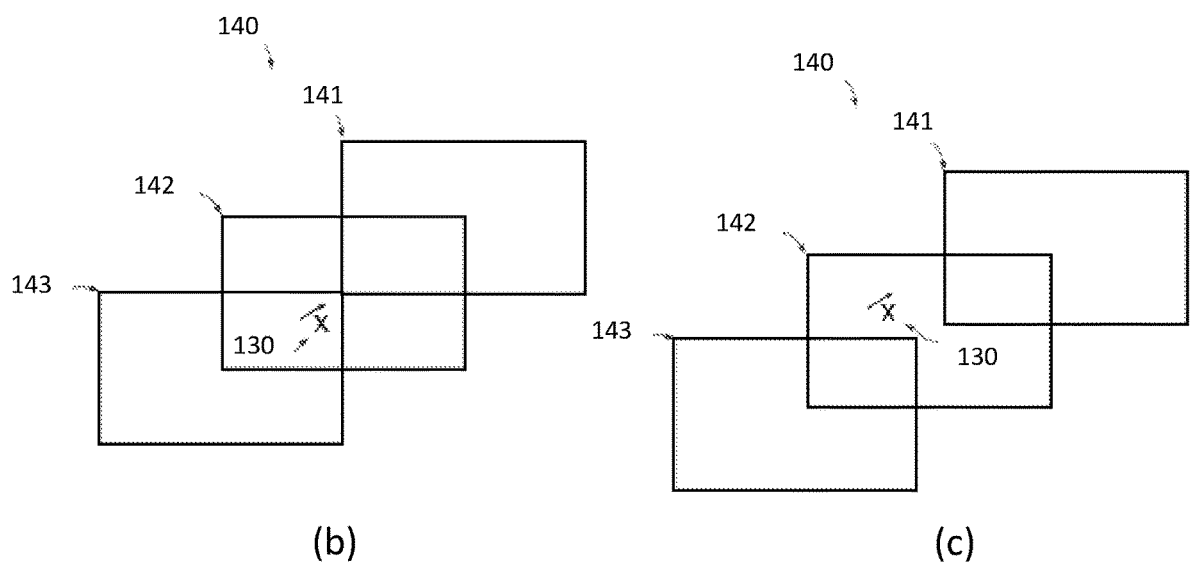

FIG. 5a shows a specific configuration of the light-field projection system 1 of FIG. 3, where two modulated light-field components 110 are deflected by the prism array 160 to such an extent that they do not overlap in the FOV of the viewer, but create a patchwork of spatially separated images 141 and 143. FIG. 5b shows the non-shifted image 142 and shifted images 141, 143 seen by the viewer focusing at infinity and FIG. 5c shows the non-shifted image 142 and shifted images 141, 143 seen by the viewer focusing at a distance closer than infinity. Their partial overlap with other viewpoints constitutes a light-field, while the periphery is covered by single images passing through their individual viewpoints.

Figure 6:
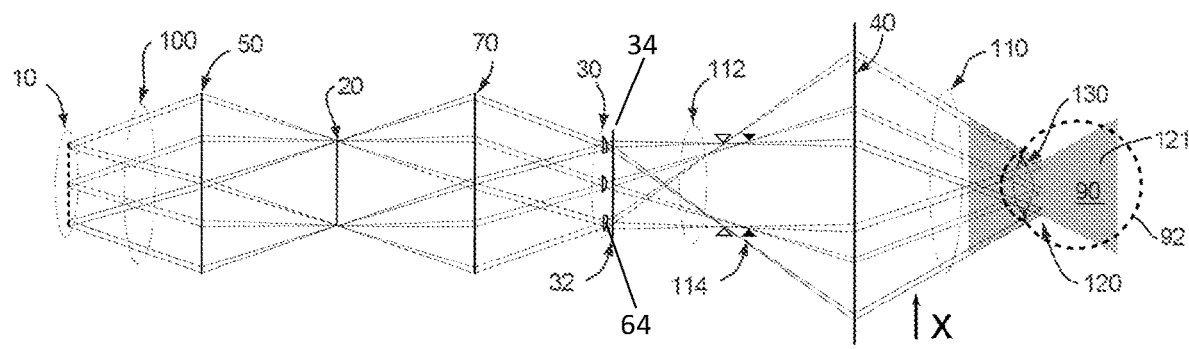
FIG. 6a shows the light-field projection system comprising offsetting lens interacting with at least one of the modulated light-field components, according to an embodiment.
FIGS. 6b and 6c show projected images of the optical light modulator of the system of FIG. 6a, when a viewer's eye focuses at infinity (FIG. 6b) and closer than at infinity (FIG. 6c)
Figure 6:
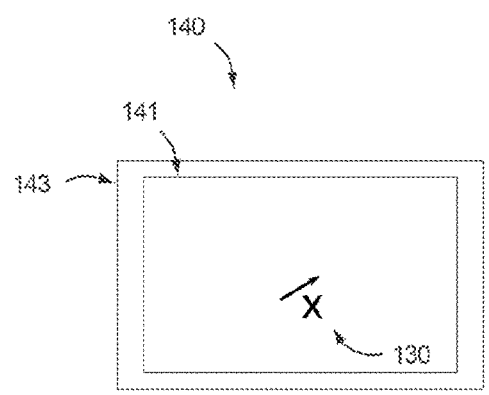
Figure 6:
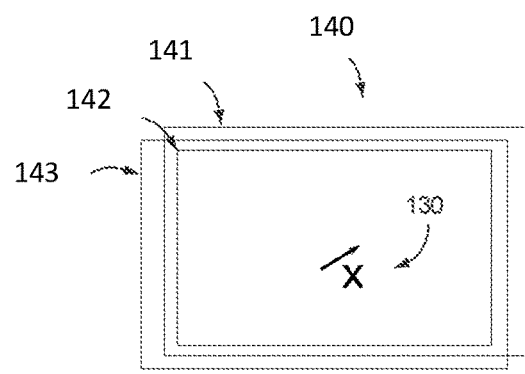

FIG. 6a shows the light-field projection system 1 comprising offsetting lenses 64 interacting with the modulated light-field components 110. Each of the offsetting lens 64 is configured such that the modulated light-field component 110 is spatially shifted in the modulator image plane 115 and such that the modulator image 114 of the modulated light-field component 110 is shifted along the projection axis 170 relative to the modulator image plane 115. In FIG. 6a, the black triangles show that the deflected modulated light-field components 110 are not spatially shifted in the modulator image plane 115 but that the corresponding modulator images 114 are shifted along the projection axis 170 to the left of the modulator images 115 of the non-deflected modulated light-field component 110 being in the modulator image plane 115.

The offsetting lens 64 can be made from an imaging lens lenses combined with a deflection prism.

In FIG. 6a, the two offsetting lenses 64 at the periphery of the first pin-light plane 30 can be formed from cut out parts of a same imaging lens, and different from the offsetting lens 64 at the center of the first pin-light plane 30. The modulated light-field components 110 passing through the two peripheric offsetting lens 64 may thus generate modulator images 114 that is shifted along the projection axis 170 relative to the modulator image plane 115 and relative to the position of the modulator image 114 generated by the modulated light-field component 110 passing through the central offsetting lens 64.

FIG. 6b shows the non-shifted image 141 and shifted images 143 seen by the viewer focusing at infinity. FIG. 6c shows the non-shifted image 142 and shifted images 141, 143 seen by the viewer focusing at a distance closer than infinity. In this configuration, the system 1 displays the modulated light-field component 110 by using two different base depth planes by which it generates full range of depths in the same way like the system with one base depth plane. Here, the expression "base depth plane" corresponds to an image plane of the optical light modulator 20 as seen by the viewer. In FIGS. 6a-6c, the offsetting lenses 64 cause a viewer to see the images in different image plane (or base depth planes) of the optical light modulator 20 SLM, depending on the offsetting lens 64 being traversed by the modulated light-field components 110. Having at least one another base depth plane can be useful for displaying high spatial-frequency images or classical flat content, such as text, at different image distance D from the eye-box region 121 than the rest of the image. Such a different image distance D can be about 50 cm. Another base depth plane can further be used for non-light-field part of the scene at infinity, etc.

The system 1 can provide better resolution images in the specific depths or it can be used as a projector of volumetric images with only several distinct depths such as one flat screen closer and second farther, or combination of a flat screen and a light-field.

Figure 7:
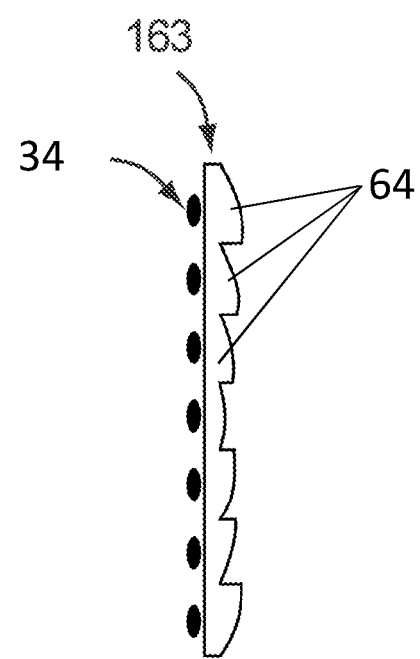
FIG. 7 illustrates the optical device comprising an array of a plurality of offsetting lens, according to an embodiment.

FIG. 7 shows a cross-section view of the optical device comprising an array 160 including a plurality of offsetting lens 64. In a possible variant, the array 160 comprising offsetting lens 64 can be obtained from a rings cut out from different imaging lenses and assembled together and concentric. Alternatively, the array 160 comprising offsetting lens 64 can be obtained from cubes cut from an imaging lense such as to create an array of different concentric imaging lens portions where several, not necessarily symmetrically distributed portions being part of the same original imaging lens, with the axis of the concentric lenses coinciding with the axis of the whole optical system.

In one aspect, the array 160 comprising offsetting lens 64 further comprises one or several neutral optical elements 61, similarly to the microprism array described with FIGS. 4a and 4b.

For example, if the modulated light-field components 110 are projected simultaneously through the array 160 comprising offsetting lens 64, the corresponding modulator images 114 will be formed at different optical distances along the projection axis 170. The modulated light-field components 110 are also deflected by the offsetting lens 64, spatially shifting the modulator images 114 in the modulator image plane 115. Thus, the light-field projection system 1 comprising the array 160 of offsetting lens 64 creates images at different optical distances along the projection axis 170 and at different positions in the modulator image plane 115.

In one aspect, the array 160 comprising offsetting lens 64 may further comprise one or several deflecting prisms 60.

Figure 8:
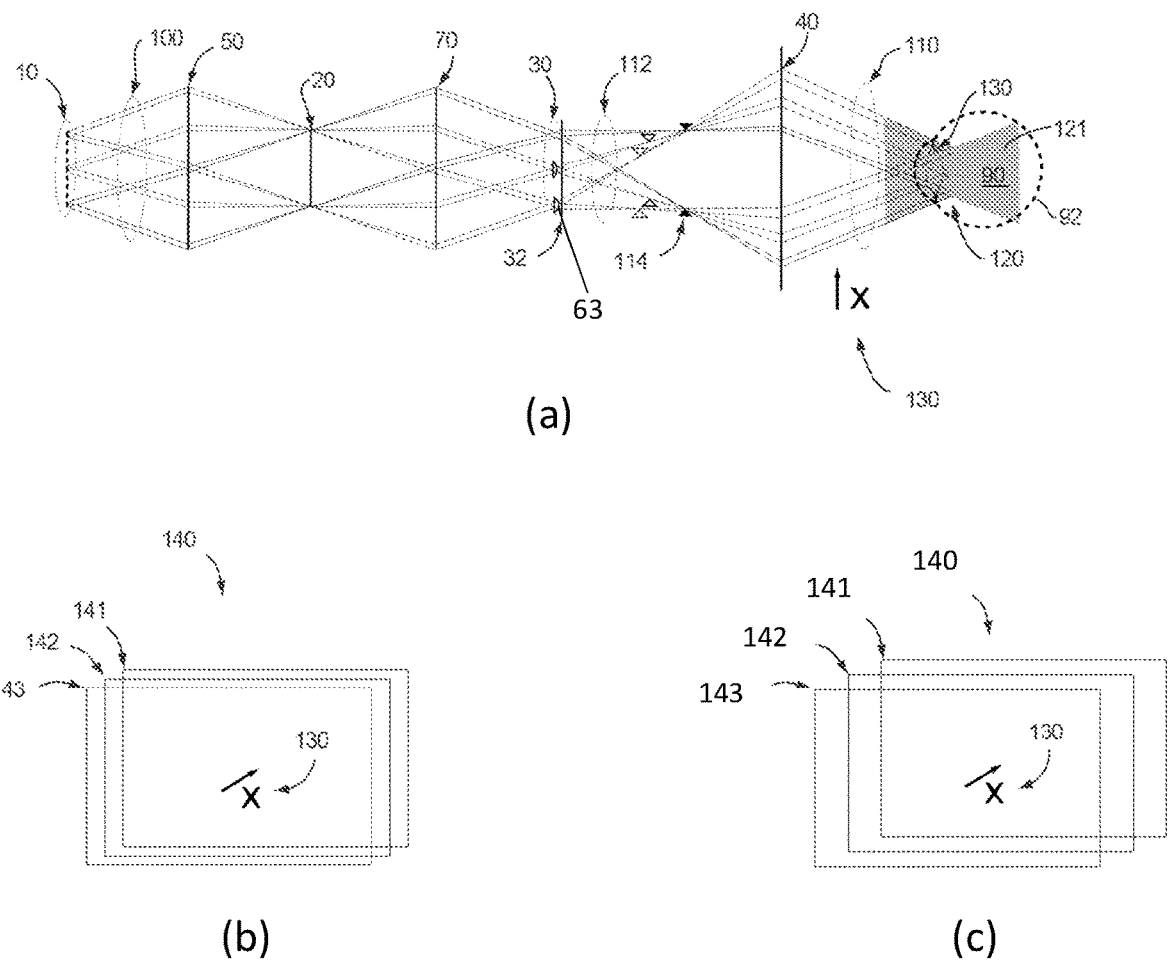
FIG. 8a shows the light-field projection system comprising imaging lens interacting with at least one of the modulated light-field components, according to an embodiment.
FIGS. 8b and 8c show projected images of the optical light modulator of the system of FIG. 8a, when a viewer's eye focuses at infinity (FIG. 8b) and closer than at infinity (FIG. 8c)

In another embodiment illustrated in FIG. 8a, the light-field projection system 1 comprises at least one imaging lens 63 configured to shift the modulator image 114 of the modulated light-field component 110 passing through the imaging lens 63 along the projection axis 170, relative to the modulator image plane 115. The imaging lens 63 does not substantially spatially shift the modulated light-field components 110 in the modulator image plane 115. This can be seen from the shifted position (white triangles) of the modulator images 114 along the projection axis 170 of the modulated light-field components 110 passing through the imaging lens 63, relative to the non-shifted modulator images 114 (black triangles) of the modulated light-field components 110 that do not pass through the imaging lens 63.

In contrast to the deflecting prism 60, the imaging lens 63 (and the offsetting lens 64) changes the vergence of the modulated light-field components 110 beam. The deflecting prism 60 does not change the vergence of the modulated light-field components 110 beam (it remains collimated), while it produces convergent (or divergent) modulated light-field component 110 beams. Thus the imaging lens 63 changes the optical position of the modulator images 114 along the projection axis 170.

This plays a role when the pin-lights and holes in the Fourier filter have considerably large diameter (such as more than 1 mm). It is therefore possible to display images in different optical distances depending on through which lens the image component passed FIG. 8b shows the image 143, 142, 141 seen by the viewer focusing at infinity. FIGS. 8c shows the image 143, 142, 141 seen by the viewer focusing at a distance closer than infinity. In addition to their apparent spatial shift, the images 143, 142, 141 can also blur or sharpen depending on the optical distance of each of the subimage. Here, the term "subimage" corresponds to a modulated light-field component 110 of one viewpoint. The subimage can be considered to be in focus since the depth of field is small due to the small modulated light-field component 110 and the pinhole. In reality, however, each viewpoint has also its own optical distance which plays a role especially when the modulated light-field component 110 and the pinhole are not small enough. Thus, the optical distance of each of the subimage may vary.

Figure 9:
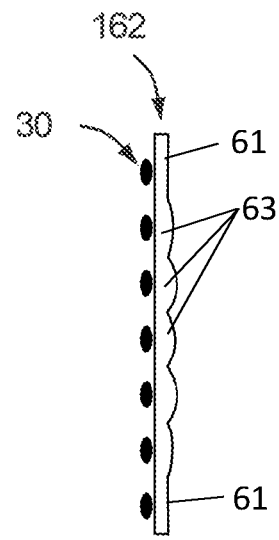
FIG. 9 illustrates the optical device comprising an array of a plurality of imaging lens, according to an embodiment.

FIG. 9 shows a cross-section view of the optical device comprising an array 160 including a plurality of imaging lens 63. In a possible variant, the array 160 comprising imaging lens 64 can further comprise one or several neutral optical elements 61.

In an aspect, the light-field projection system 1 can comprise any one or a plurality, alone or in combination of the deflecting prism 60, the neutral optical element 61, the imaging lens 63 and the offsetting lens 64. Of course, in order to obtain spatial shift in the modulator image plane 115 of the modulated light-field components 110, the light-field projection system 1 must comprise at least a deflecting prism 60 or an offsetting lens 64.

In an embodiment, the array 160 is configured to interact with each of said modulated light-field components 110.

In an aspect, one modulated light-field components 110 passes through an optical device 60, 61, 63, 64 of the array 160.

Figure 10:
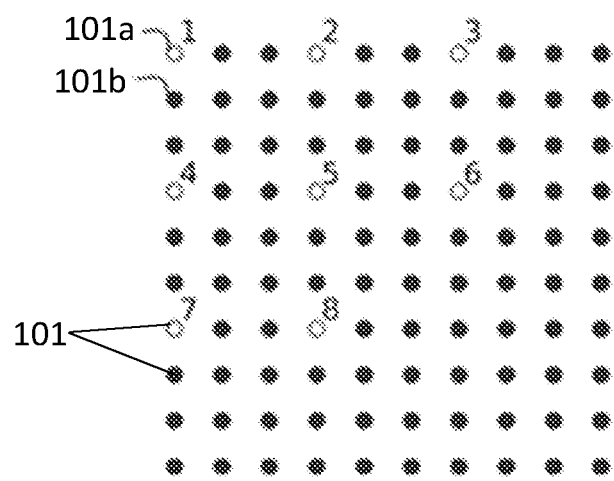
FIG. 10 shows a pin-light array comprising an array of point lights.

FIG. 10 shows a possible implementation of the pin-light array 10 comprising an array containing 100 pin lights 101. The pin lights 101 can be illuminated simultaneously such that the modulated light-field components 110 are projected simultaneously. Alternatively, the pin lights 101 can be illuminated sequentially such that the modulated light-field components 110 are projected sequentially. The latter option is shown in FIG. 10 by the active pin lights 101*a* and the inactive pin lights 101*b*. The active pin lights 101*a* project incident light-fields 100 illuminating the optical light modulator 20, such as to project the corresponding modulated light-field components 110 along a projection axis 170. In FIG. 10; the numerals 1 to 8 illustrate a possible sequence of illumination of the different pin lights 101 in the pin-light array 10. Other illumination sequences can also be considered.

Figure 11:
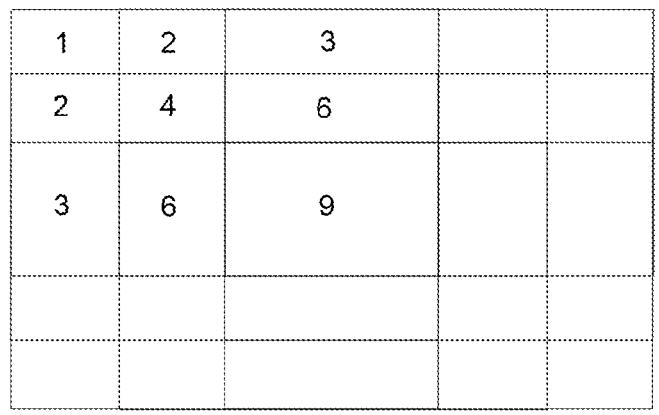
FIG. 11 illustrates a patchwork of projected second pin-light images seen by a viewer using the light-field projection system comprising deflecting prisms and the pin-light array comprising nine point-lights.

FIG. 11 illustrates a patchwork of projected modulator images 114 as would be seen by a viewer using the light-field projection system 1 comprising the microprism array 160 at the first pin-light plane 30 and a pin-light array 10 comprising nine pin-lights 101. The external periphery of the rectangle corresponds to the size of the projected image 144 corresponding to the FOV of the viewer (in a plane). All nine modulator images 114 (viewpoints) overlap in a central area 145 of the projected image. There is less and less overlap of the modulator images 114 farther from the central area 145. There is only one modulator image 114 in the corners. Thus, the central area 145 corresponds to a narrow FOV having high light-field and color resolution and the peripheral area corresponds to a wider FOV having lower light-field (depth) and color resolution. In other words the central area 145 corresponds to a foveated area having high light-field and color resolution. The light-field projection system 1 can thus provide a combination of high light-field and color resolution in narrow FOV and low resolution in large FOV.

Figure 12:
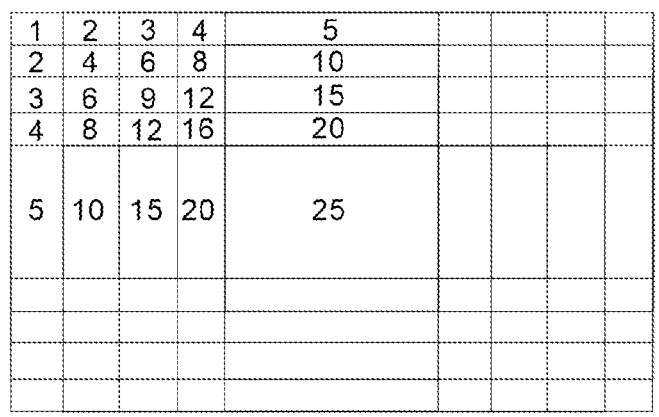
FIG. 12 illustrates a patchwork of projected second pin-light images when the pin-light array comprising 25 point-lights.

FIG. 12 illustrates a patchwork of projected modulator images 114 as would be seen by a viewer using the light-field projection system 1 comprising the microprism array 160 at the first pin-light plane 30 and a pin-light array 10 comprising 25 point-lights 101. The same reasoning holds as for FIG. 11 while showing the situation of more realistic higher resolution system.

Figure 13:
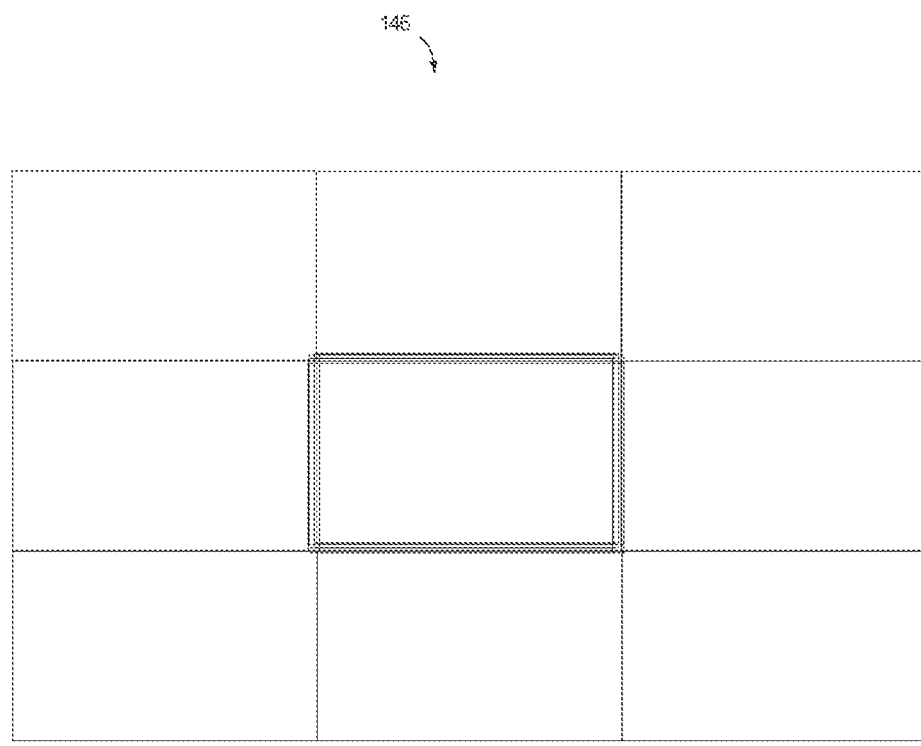
FIG. 13 shows another example of patchwork of projected second pin-light images.

FIG. 13 shows another example of patchwork of projected modulator images 114 distributed by deflecting prisms 60 so that the center area 145 creates multi-component light-field (comprising a plurality of modulator images 114) while the periphery is covered by 8 individual shifted modulator images 114.

Figure 14:
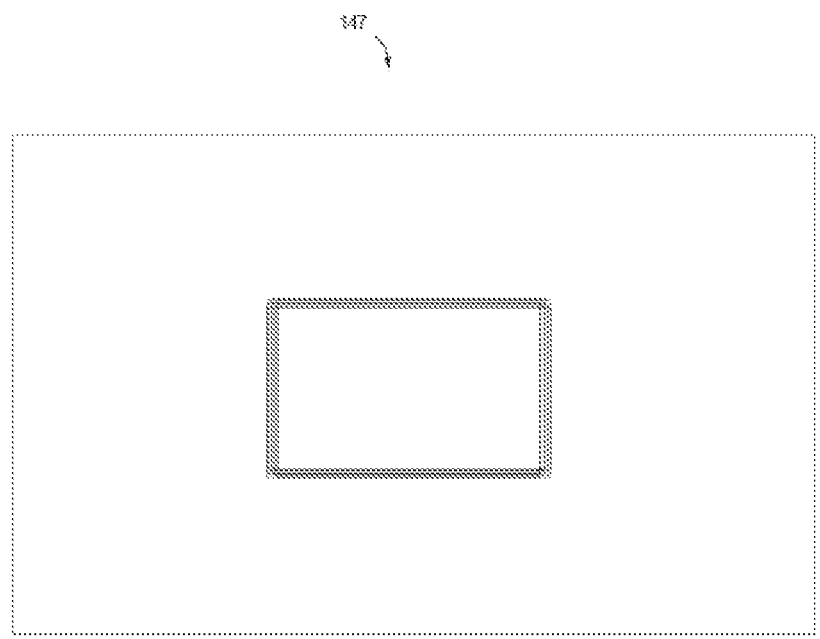
FIG. 14 shows yet another example of patchwork of projected second pin-light images.

FIG. 14 shows another example of patchwork of projected modulator images 114, where the modulated light-field components 110 are projected simultaneously through the array 160 such as to create the wide FOV peripheral image with low angular, color and depth resolution while the center area 145 creates high resolution multi-component light-field (comprising a plurality of modulator images 114).

In an embodiment, the light-field projection system 1 comprises an eye-tracking and projection steering device. The eye-tracking and projection steering device may be used to determine where a viewer is looking to thereby determine where the foveal region is in relation to the projected image 144. Here, the foveal region corresponds to the center area 145 of the projected image 144.

It is understood that the present invention is not limited to the exemplary embodiments described above and other examples of implementations are also possible within the scope of the patent claims.

The optical light modulator 20 can comprise a spatial light modulator (SLM), for example a transmissive spatial light modulator or a reflective spatial light modulator. The SLM can comprises a fast reflective SLM such as a liquid crystal on silicon (LCoS) or a ferroelectric liquid crystal on silicon (FLCoS), a digital micromirror device (DMD), or other suitable modulator.

The light-field projection system 1 can comprise a collimating or partly collimating lens 50. The pin-light array 10 illuminates the optical light modulator 20 through the collimating or partly collimating lens 50. The collimating or partly collimating lens 50 can comprise reflective or holographic element having the same function as a collimating or partly collimating lens.

Figure 15:
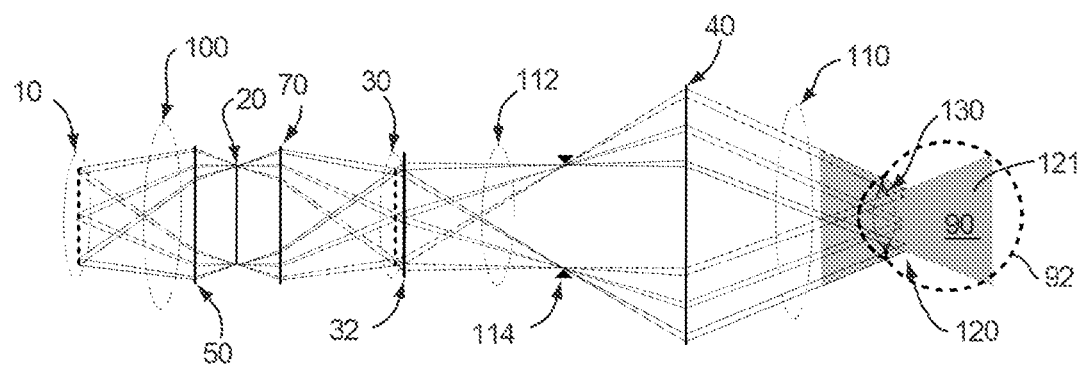
FIG. 15 shows the light-field projection system, according to an alternative configuration.

FIG. 15 shows the light-field projection system 1 according to an alternative configuration whereby the collimating or partly collimating lens 50 and the first pin-light optical element 70 can be the same optical element being placed on the surface of a reflective spatial light modulator 20.

Figure 16:
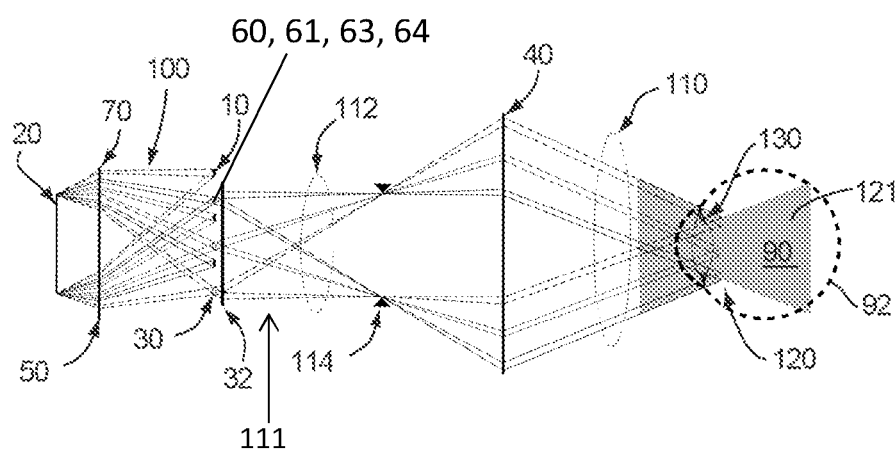
FIG. 16 shows the light-field projection system, according to another alternative configuration.

FIG. 16 shows the light-field projection system 1 according to an alternative configuration whereby the collimating or partly collimating lens 50 and the first pin-light optical element 70 are the same optical element being placed on the surface of a reflective spatial light modulator 20. Moreover, the pin-light array 10 coincides with the optical device 60, 61, 63, 64 in the first pin-light plane 30. The pin-light array 10 may also coincide with the Fourier filter 34 if such filter is present. In such configuration, the pin-light array 10 should comprise holes (openings) to let the modulated light-field components 110 pass through the pin-light array 10 and reach the modulator optical element 32.

Figure 17:
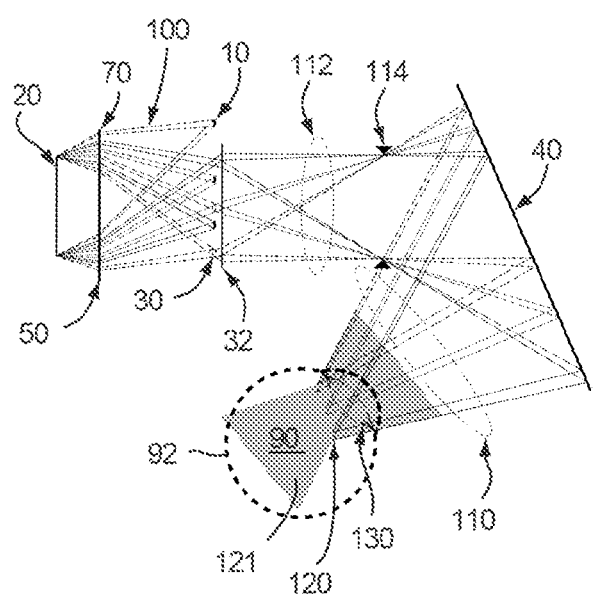
FIG. 17 shows the light-field projection system, according to yet another alternative configuration.

FIG. 17 shows the light-field projection system 1 according to another alternative configuration whereby the second optical element 40 comprises a combiner. The combiner 40 is configured for reflecting the modulated light-field components 110 coming from the modulator optical element 32 and for forming second pin-light images 120 in the second pin-light plane 124 within the eye-box 121. The combiner 40 can comprise waveguides with holographic grating which provide images in a fixed focal plane (a stack of waveguides can be used to provide multiple focal planes), a holographic reflector including a holographic pattern, a dome shape semi-transparent mirrors with a beam splitter or an ellipsoid combiner. The combiner 40 can further comprise a semi-transparent first element including a first reflecting surface having a concave and ellipsoid shape. The combiner 40 can further comprise a general free-form surface. The combiner 40 can comprise array of differently or identically inclined mirrors.

The combiner can be further configured for transmitting natural light from the real world towards the eye box, such that both projected virtual light-field and natural light are projected, via the combiner, within the eye box region 121.

REFERENCE NUMBERS AND SYMBOLS

10 pin-light array
20 optical light modulator, spatial light modulator (SLM),
30 first pin-light plane 31 first pin-light images
32 modulator optical element
34 Fourier filter
40 second optical element
50 collimating or partly collimating lens
60 deflecting prism
61 neutral optical element
63 imaging lens
64 offsetting lens
70 first pin-light optical element
90 eye
92 retina
100 incident light-field
101 point-light
101a active point-light
101b inactive point-light
110 modulated light-field component
110a incident modulated light-field component
110b exit modulated light-field component
112 modulated and filtered virtual light-field
114 modulator image
115 modulator image plane
120 second pin-light images, viewpoints
121 eye-box region
124 second pin-light plane, exit pupil
130 pupil
140, 141 projected image
142, 143 projected image
145 central area of the projected image
160 microprism array
162 imaging lens array
163 lens element
164 offsetting lens array
165 offsetting lens element
170 projection axis
$\theta_a$ apex angle
$\theta_D$ deflection angle
D image distance

The invention claimed is:

1. Light-field projection system, comprising:
a pin-light array comprising a plurality of point-lights and generating an incident light-field illuminating an optical light modulator configured for modulating the incident light-field and projecting a plurality of modulated light-field components along a projection axis;
a first optical element configured for forming first pin-light images in a first pin-light plane and modulator images in a modulator image plane; and
a second optical element defining an eye-box region and configured for forming second pin-light images in a second pin-light plane within the eye-box;
wherein the first and second pin-light planes and the modulator image plane are substantially perpendicular to the projection axis and wherein the modulator image plane is between the first optical element and second optical element;
the system further comprising at least one optical device at the first pin-light plane and being configured to deflect at least one of the modulated light-field components, such as to spatially shift the modulator image corresponding to said at least one of the modulated light-field components in the modulator image plane.

2. The system according to claim 1,
wherein the optical device comprises at least one deflecting prism configured to deflect said at least one of the modulated light-field components by a predetermined angle.

3. The system according to claim 1,
wherein the optical device comprises at least one offsetting lens configured such that said at least one of the modulated light-field components is spatially shifted in the modulator image plane; and
such that the modulator image of said at least one of the modulated light-field components is shifted along the projection axis relative to the modulator image plane.

4. The system according to claim 2,
wherein the optical device further comprises at least one imaging lens configured to shift the modulator image of said at least one of the modulated light-field components along the projection axis, relative to the modulator image plane.

5. The system according to claim 2, wherein the optical device further comprises at least one neutral optical element interacting with at least one modulated light-field component such that the modulated light-field component is optically not modified.

6. The system according to claim 1, wherein said at least one optical device comprises a plurality of optical device arranged in an array, each optical device interacting with at least one modulated light-field component.

7. The system according to claim 6,
wherein the array comprises a plurality of deflecting prisms.

8. The system according to claim 6,
wherein the array comprises one or a plurality of offsetting lens.

9. The system according to claim 7,
wherein the plurality of optical devices are arranged such as to deflect the modulated light-field components by different predetermined angles.

10. The system according to claim 9,
wherein the modulated light-field components are deflected by increasing predetermined angles from the center toward the periphery of the array.

11. The system according to claim 7, wherein the array comprises at least one neutral optical element and/or at least one imaging lens.

12. The system according to claim 6, wherein the array is configured to interact with each of said modulated light-field components.

13. The system according to claim 1, wherein the plurality of modulated light-field components are projected simultaneously.

14. The system according to claim 1, wherein the plurality of modulated light-field components are projected sequentially.

15. The system according to claim 1, further comprising an eye-tracking and steering device configured to determine the spatially shifting in the modulator image plane.

16. The system according to claim 1, wherein the first optical element comprises a imaging lens configured for forming the first pin-light images in the first pin-light plane and a modulator optical element configured for forming modulator images in the modulator image plane.

* * * * *